United States Patent [19]

Shiba et al.

[11] Patent Number: 5,034,844
[45] Date of Patent: Jul. 23, 1991

[54] DISC CARTRIDGE WITH BENT SHUTTER PLATE TO FACILITATE MOUNTING OF SHUTTER PLATE ON DISC CASING

[75] Inventors: Haruo Shiba; Masaru Ikebe, both of Nagano, Japan

[73] Assignee: TDK Corporation, Japan

[21] Appl. No.: 271,117

[22] Filed: Nov. 14, 1988

[30] Foreign Application Priority Data

Nov. 13, 1987 [JP] Japan .......................... 62-172598[U]

[51] Int. Cl.[5] .............................................. G11B 23/03
[52] U.S. Cl. ..................................... 360/133; 369/291
[58] Field of Search .......................... 360/133; 369/291

[56] References Cited

U.S. PATENT DOCUMENTS

| | | | |
|---|---|---|---|
| 4,581,670 | 4/1986 | Nemoto et al. | 360/133 |
| 4,648,001 | 3/1987 | Komatsu et al. | 360/133 |
| 4,660,118 | 4/1987 | Faber | 360/133 |
| 4,740,948 | 4/1988 | Nakamori et al. | 369/291 |

FOREIGN PATENT DOCUMENTS

| | | | |
|---|---|---|---|
| 0164647 | 12/1985 | European Pat. Off. | 360/133 |
| 62-217478 | 9/1987 | Japan | 360/133 |
| 64-53390 | 1/1989 | Japan | 360/133 |

Primary Examiner—John H. Wolff
Attorney, Agent, or Firm—Steinberg & Raskin

[57] ABSTRACT

A disc cartridge capable of readily fitting a holding plate in a casing to facilitate assembling of the cartridge without using any adhesion. Shutter plates each are formed at its distal end with a depression which is slidably interposed between a recess of the casing and the holding plate received in the recess and holding elements are provided at the casing and positioned above the holding plate in a manner to overhang the recess, resulting in positively and stably holding the holding plate in the recess, so that the holding plate may be readily arranged fitted in the casing by merely inserting it in the recess.

14 Claims, 8 Drawing Sheets

DISC CARTRIDGE WITH BENT SHUTTER PLATE TO FACILITATE MOUNTING OF SHUTTER PLATE ON DISC CASING

BACKGROUND OF THE INVENTION

1. Field of the Invention

This invention relates to a disc cartridge, and more particularly to a disc cartridge which is adapted to rotatably receive a disc medium such as an optical disc, a photo-magnetic disc, a magnetic disc, a floppy disc or the like therein.

2. Description of the Prior Art

In general, a disc cartridge such as a tray system or a cartridge system using a casing has been conventionally employed for protecting a floppy disc, a compact disc, a video disc or the like which is used for a digital-data storing unit, a video unit or the like from damage and dust to ensure its safety.

For this purpose, the conventional disc cartridge, as shown in FIGS. 1 to 3, is provided with a slidable shutter 200 which is adapted to close a pickup inserting hole 202 and/or a drive pin inserting hole (not shown) of a casing 204 in nonuse and open them in use. The pickup inserting hole 202 is provided for inserting a pickup of a disc cartridge operating unit such as a recording and/or reproducing unit (hereinafter referred to as "cartridge operating unit") therethrough into the casing.

In the so-constructed conventional disc cartridge, when the shutter 200 is formed into an elongated shape, a holding plate 206 is used for guiding a distal end of the shutter 200 in a recess 208 of the casing 204. Mounting of the holding plate 206 with respect to the casing 204 is carried out using any adhesive means 210 such as an adhesive or a double-coated adhesive tape applied with respect to a half of a width of a rear surface of the holding plate 206 in a longitudinal direction thereof. Unfortunately, this has a negative effect on the operating efficiency in assembling of the disc cartridge, because an operation to apply the adhesive means 210 to the holding plate 206 or casing 204 is required. Also, this requires the holding plate 206 to be large because the holding plate is required to have a width sufficient to facilitate mounting of it on the casing 204 through the adhesive means, resulting in the disc cartridge being large and costly. Further, misregistration of the holding plate 206 with respect to the shutter 200 in the operation of mounting the holding plate 206 on the casing leads to contact between the adhesive means 210 and the shutter 200 to deteriorate smooth actuation or operation of the shutter.

Accordingly, it would be highly desirable to develop a disc cartridge which is capable of readily mounting a holding plate on a casing without using any adhesive means while ensuring smooth operation of a shutter.

SUMMARY OF THE INVENTION

Generally speaking, in accordance with the present invention, a disc cartridge is provided. The disc cartridge includes a casing comprising an upper casing member and a lower casing member joined together to define a space therein and formed with at least one pickup inserting hole and a disc rotatably received in the space of the casing. In an embodiment of the present invention, the pickup inserting hole may be formed at each of the upper and lower casing members. The disc cartridge also includes a shutter formed into a substantially U-shape and including an upper shutter plate and a lower shutter plate. The shutter is slidably fitted on the casing for operating the pickup inserting hole. At least one of the upper and lower shutter plates is inwardly bent or depressed at a distal end thereof. In an embodiment of the present invention, each of the upper and lower shutter plates may be bent at its distal end. The casing is formed with a recess for movably receiving the bent or depressed end of the shutter plate. In an embodiment of the present invention, the recess may be formed at each of the upper and lower casing members. The disc cartridge of the present invention also includes a holding plate received in the recess of the casing. The bent end of the shutter plate is slidably interposed between a bottom surface of the recess and the holding plate in the recess. Further, the disc cartridge of the present invention includes holding means provided at the casing and arranged above the holding plate for holding the holding plate in the recess. In an embodiment of the present invention, the holding means may comprise a plurality of holding elements in the form of projections provided at each of the upper and lower casing members in a manner to overhang the recess and be spaced from each other at predetermined intervals in a direction of the shutter.

Accordingly, it is an object of the present invention to provide a disc cartridge which is capable of facilitating mounting of a shutter on a casing while ensuring smooth and positive operation of the shutter.

It is another object of the present invention to provide a disc cartridge which is capable of being readily assembled.

It is a further object of the present invention to provide a disc cartridge which is capable of ensuring smooth operation of a shutter with high reliability and accuracy.

It is still another object of the present invention to provide a disc cartridge which is capable of permitting a shutter to be readily mounted on a casing without adversely affecting a disc and negatively affecting aesthetic characteristics of the cartridge.

It is still a further object of the present invention to provide a disc cartridge which is being relatively small.

Still other objects and advantages of the invention will become apparent hereinafter.

BRIEF DESCRIPTION OF THE DRAWINGS

For a fuller understanding of the invention, reference is had to the following description taken in connection with the accompanying drawings; wherein.

DETAILED DESCRIPTION OF THE PREFERRED EMBODIMENT

Figure 1:
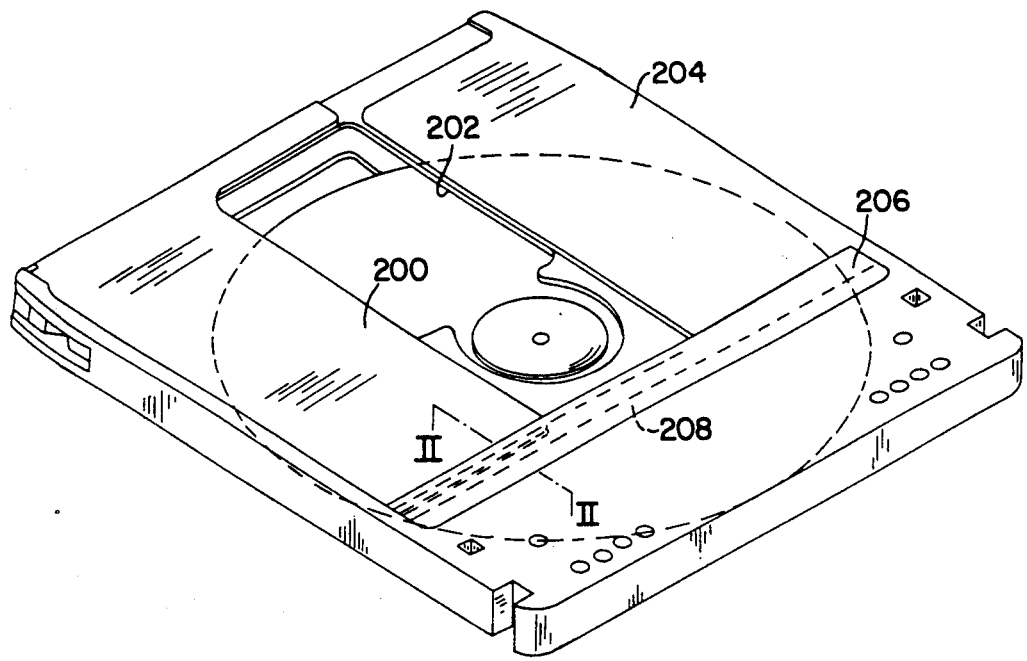
FIG. 1 is a perspective view showing a conventional disc cartridge wherein a shutter is moved to open a pickup inserting hole.
Figure 2:
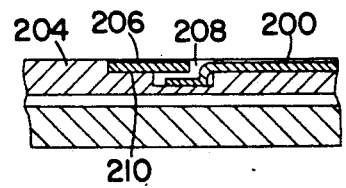
FIG. 2 is a sectional view taken along line II—II of FIG. 1.

Now, a disc cartridge according to the present invention will be described hereinafter with reference to FIGS. 4 to 18, wherein like reference numerals designate like parts throughout.

The following description will be made in connection with an optical disc cartridge. However, the present invention is not limited to such an optical disc cartridge.

FIGS. 4 to 18 illustrate an optical disc cartridge which is an embodiment of a disc cartridge according to the present invention. An optical disc cartridge of the illustrated embodiment includes an optical disc 10 and a casing 12 for rotatably receiving the disc 10 therein. The casing 12 is constituted by an upper casing member 14 and a lower casing member 16 which are joined together to define a disc receiving space therein. The casing 12 is formed with at least one pickup inserting hole 18, through which a pickup of a cartridge operating unit is inserted into the casing 12 for driving the disc 10. In the illustrated embodiment, the pickup inserting hole 18 is formed at each of the upper and lower casing members 14 and 16.

Figure 6:
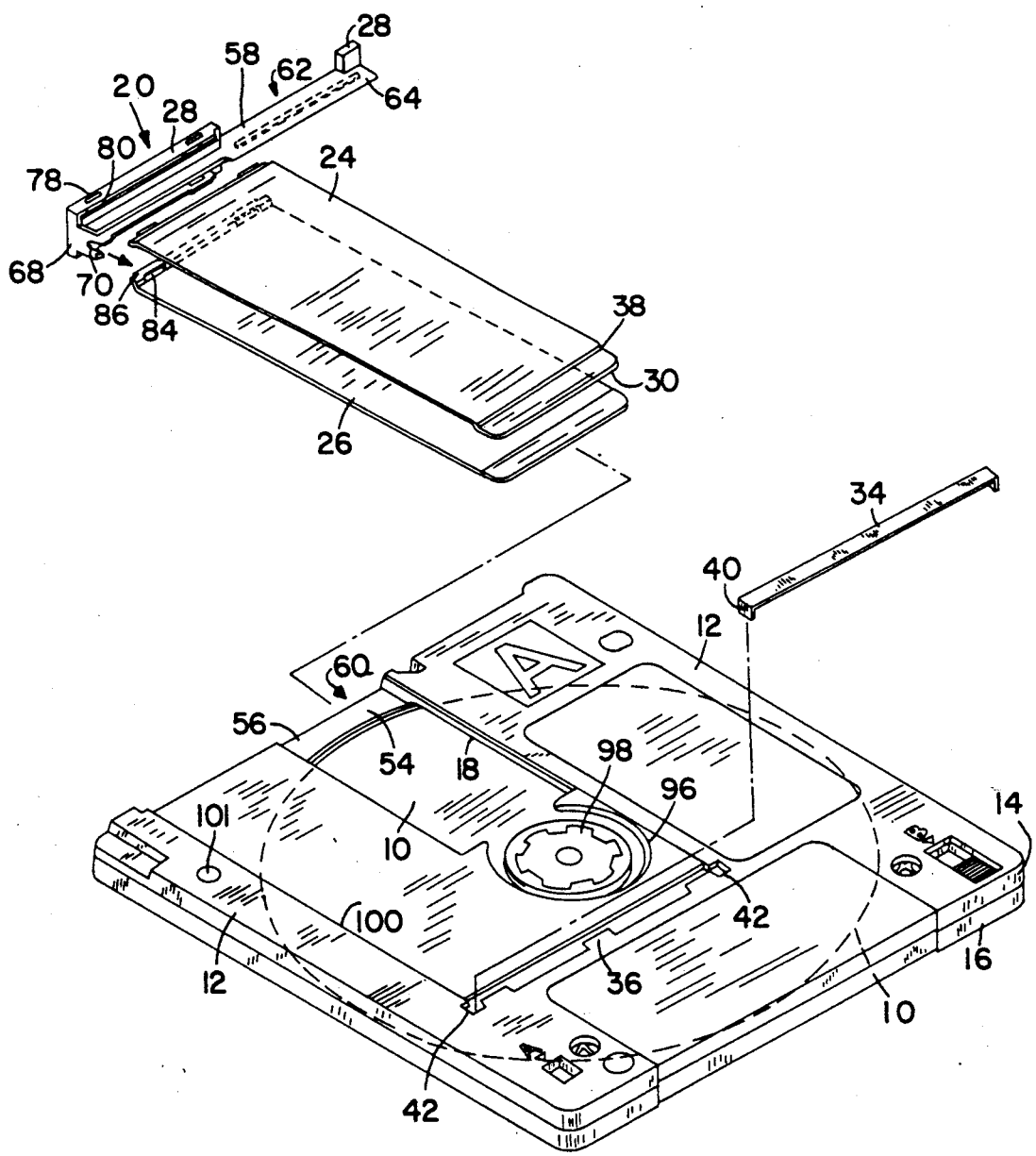
FIG. 6 is an exploded perspective view of the disc cartridge shown in FIG. 4.
Figures 7, 8, 9:
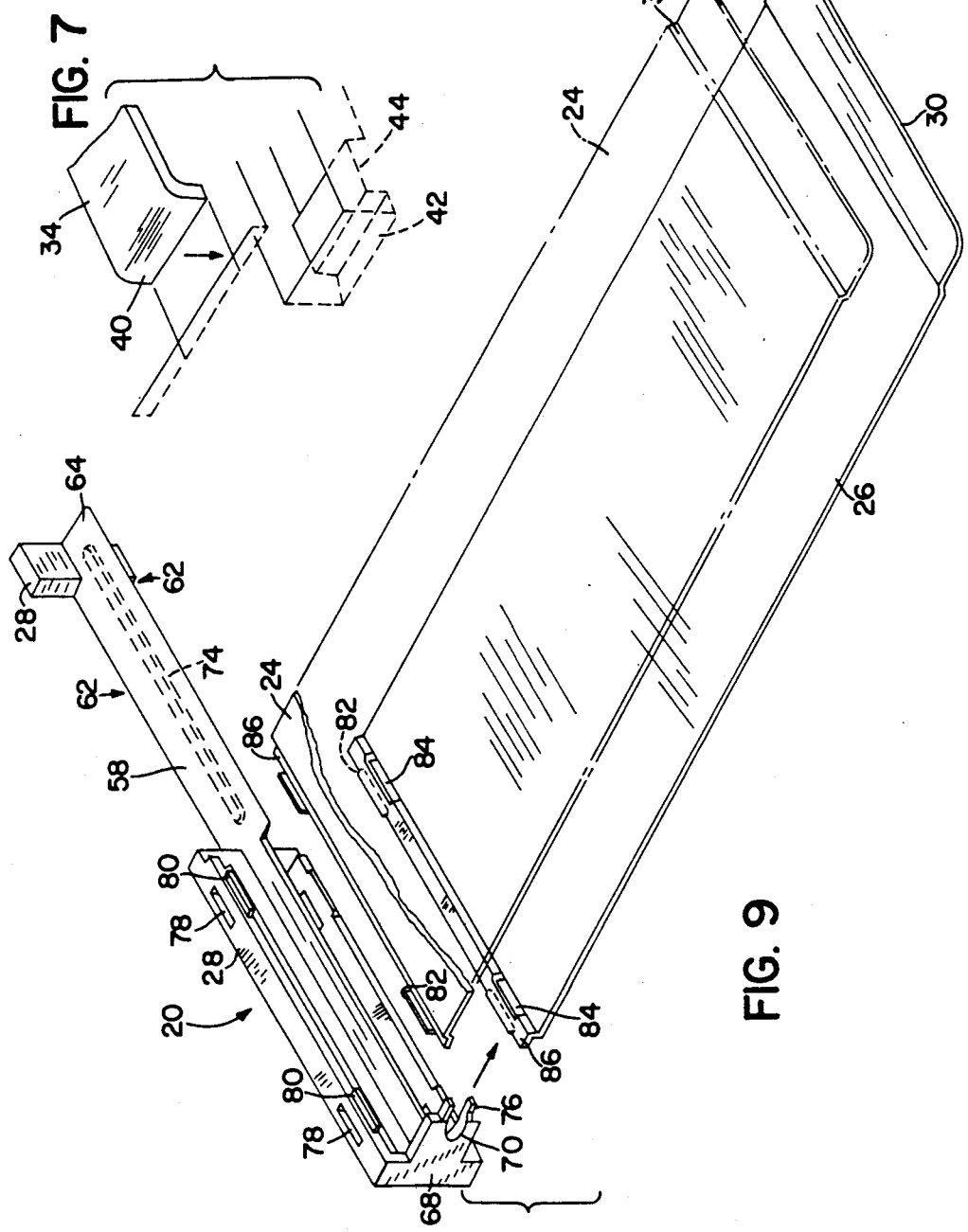
FIG. 7 is a fragmentary enlarged perspective view showing a holding plate.
FIG. 8 is a fragmentary enlarged sectional view of the holding plate shown in FIG. 7.
FIG. 9 is an exploded enlarged perspective view showing a shutter.

The disc cartridge also includes a shutter 20 operated for opening and closing the pickup inserting holes 18 and at least one drive shaft inserting hole of the casing 12 while interposing upper and lower surfaces of the casing 12 therebetween. For this purpose, the shutter 20 is formed into a substantially U-shape. More particularly, the shutter 20 includes upper and lower shutter plates 24 and 26 and a slider 28 for connecting the upper and lower shutter plate members 24 and 26 therethrough to each other, as shown in FIGS. 6 and 9. Thus, the slider 28 acts as a side wall of the shutter 20 as well as provides the shutter 20 with a sliding function. The upper and lower shutter plates 24 and 26 may be made of stainless steel such as SUS 304 and the slider 28 is preferably formed of a lubricous material such as polyacetal.

At least one of the shutter plates 24 and 26 is inwardly bent or depressed at a distal end thereof to provide a depression 30. In the illustrated embodiment, the depressed end 30 is formed at each of both upper and lower shutter plates 24 and 26. Correspondingly, the upper and lower casing members 14 and 16 each are formed on an outer surface thereof with a recess 32 which is adapted to receive the depressed distal end 30 of the shutter plate therein. In the illustrated embodiment, the recess 32 may be formed into a length substantially equal to a stroke width of the shutter 20. The disc cartridge also includes a holding plate 34 which is formed into an elongated shape and is adapted to be fittedly received in the recess 32 so that the depression or bent end 30 of the shutter plate may be interposed between a lower surface of the recess 32 and the holding plate 34 in a manner to be slidable in a longitudinal direction of the recess 32. The plate may be formed into a length substantially equal to a stroke width of the shutter 20.

Also, each of the casing members 14 and 16 is provided with holding means which comprises at least one holding element 36 arranged above the holding plate 34 for downwardly holding the holding plate 34 in the recess 32, to thereby positively and stably hold the depression 30 in the recess 32. In the illustrated embodiment, the holding element 36 is in the form of a projection formed at each of the casing members in a manner to horizontally extend so that it overhangs the recess 32. Such construction permits the depressed distal end 30 of the shutter plate to be positively and stably held in the recess 32 in a manner to be slidably interposed between the bottom surface of the recess 32 and the holding element 34. For this purpose, the depression or bent end 30 is preferably formed through a stepped portion 38 to facilitate positioning of the depression 30 in the recess 32. Also, in the illustrated embodiment, a plurality of the holding elements 36 are provided in a manner to be spaced from each other at predetermined intervals in a longitudinal direction of the recess 32, resulting in the depression 30 being more stably and positively held in the recess 32. In the illustrated embodiment, three such holding elements or projections 36 are provided. Further, each of the projections 36 is preferably formed in a manner such that its outer surface is flush with an the outer surface of each of the casing members 14 and 16.

In the illustrated embodiment, the holding plate 34 is made of a metal strip and formed into a substantially C shape by substantially perpendicularly bending each of its both ends 40 in the same direction. Correspondingly, the recess 32 of the casing member is formed with holding portions or holding grooves 42 in a manner to positionally correspond to the bent ends 40 of the holding plate 34 received in the recess 32, so that when the holding plate 34 is received in the recess 32, it may be accurately positioned in the recess 32 through fitted engagement between the bent ends 40 of the holding plate 34 and the holding grooves 42.

However, the embodiment is not limited to the abovedescribed construction of the holding plate 34. More particularly, the holding plate 34 may be formed into an elongated flat shape without bending its both ends. In this instance, the holding plate 34 is inserted at its both ends into the grooves 42 utilizing elasticity of the plate 34.

In the illustrated embodiment, as shown in FIGS. 7 and 8, it is preferable that the recess 32 of the casing 12 is provided on a portion of its bottom surface inside or adjacent to each of the grooves 42 with a position regulating rib 44 of a thickness substantially equal to or more than the thickness of the shutter plate, to thereby stably and positively carry out positioning of the plate 34 in the recess 32.

Figure 16:
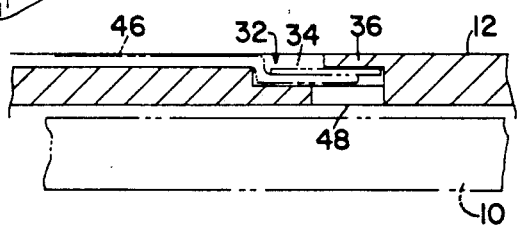
FIG. 16 is a fragmentary enlarged sectional view taken along line XVI—XVI of FIG. 14.
Figure 17:
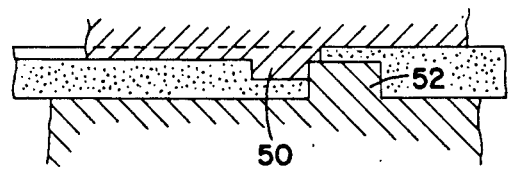
FIG. 17 is a schematic sectional view showing molds used for forming a casing.
Figure 18:
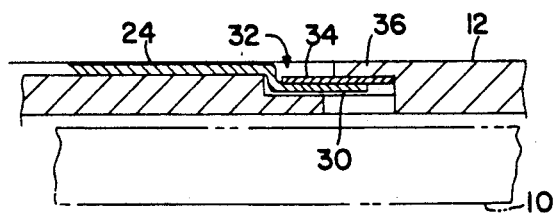
FIG. 18 is a sectional view similar to FIG. 16.

Formation of the recess 32 and holding elements 36 at each of the upper and lower shutter plates 24 and 26 may be carried out by concurrently forming a space 46 and an opening 48 for the shutter plate as shown in FIG. 16 using upper and lower molds provided with abutting projections 50 and 52 as shown in FIG. 17, resulting in the recess and holding element as shown in FIG. 18.

Figure 3:
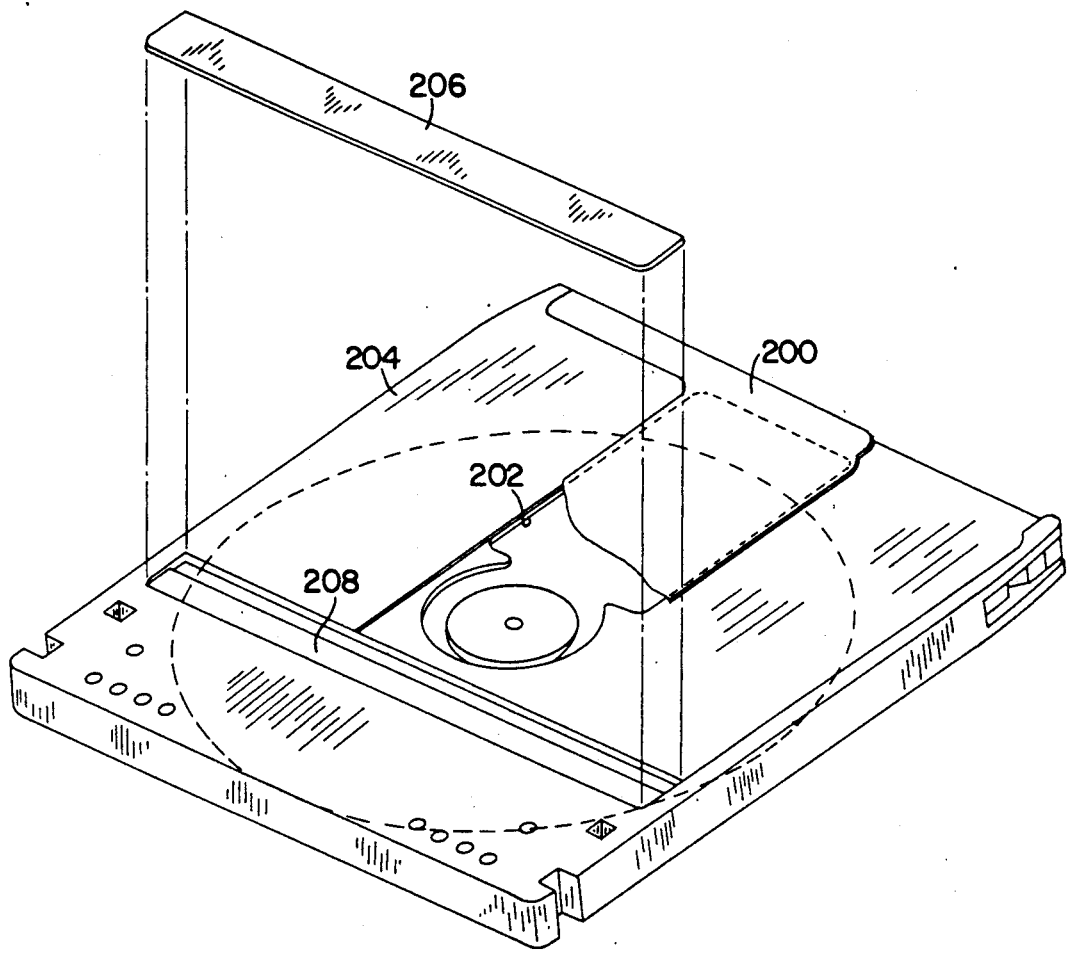
FIG. 3 is a partially exploded perspective view of the disc conventional cartridge shown in FIG. 1.
Figure 4:
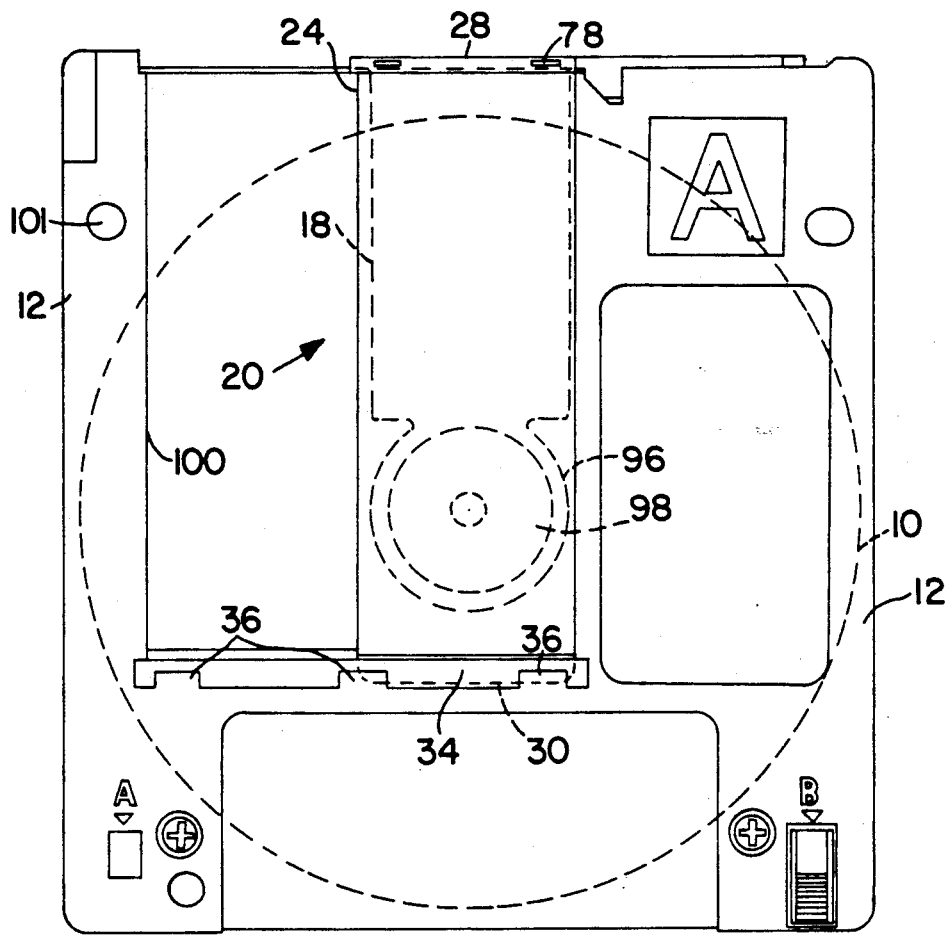
FIG. 4 is a plan view showing an embodiment of a disc cartridge according to the present invention.
Figure 13:
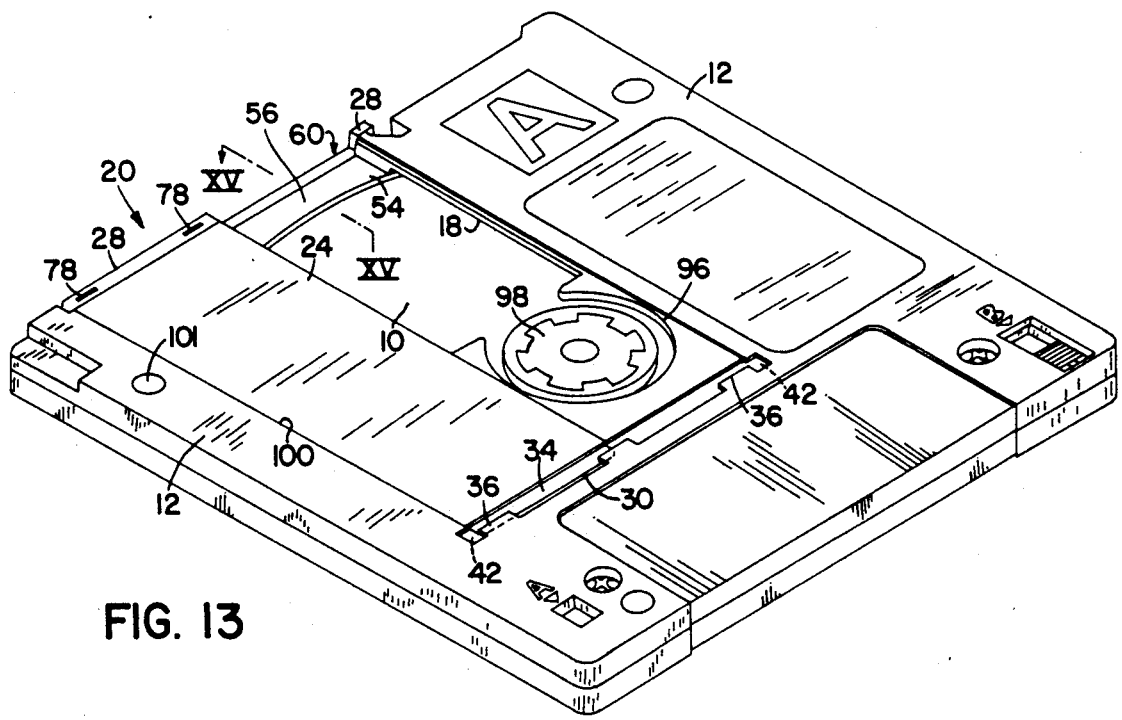
FIG. 13 is a perspective view of the disc cartridge shown in FIG. 4 wherein a shutter is moved to open a pickup inserting hole.

Also, the illustrated embodiment, as shown in FIGS. 3 and 13, may be so constructed that an insertion-side wall 54 of the casing 12, namely, a front wall of the casing 12 positioned on an insertion side of the casing through which the casing is inserted into a cartridge operating unit is formed at a portion thereof defining each of the pickup inserting holes 18 into a first thin-walled section 56 having a level substantially equal to or below a level of a surface of the disc 10. It is preferable that the slider 28 of the shutter 20 which is slidably moved on the front wall 54 of the casing 12 is likewise formed into a second thin-walled section 58 of a level substantially equal to or below the level of the disc at a portion thereof positionally corresponding to the first thin-walled section 54 of the casing 12 when the shutter 20 is moved to open the pickup inserting holes 18, as shown in FIGS. 6 and 9. More particularly, the illustrated embodiment may be so constructed that the above-described portion of the front wall 54 of the casing 12 is formed into a thickness substantially equal to or smaller than a thickness of the disc 10, to thereby provide the first thin-walled section 56 and the above-described portion of the slider 28 is formed into a thickness substantially equal to or smaller than the thickness of the disc 10, resulting in the second thin-walled section 58. In the illustrated embodiment, the first thin-walled section 56 is provided by forming cutouts 60 of a width substantially equal to a stroke width of the shutter 20 on both upper and lower surfaces of the front wall 54 of the casing 12. The second thin-walled section 58 may be provided by forming cutouts 62 on upper and lower surfaces of a portion of the slider 28 except a portion thereof connected to the upper and lower shutter plates 24 and 26 of the shutter 20.

The second thin-walled section 58 may be formed in a manner to horizontally inwardly extend, to thereby provide a rib-like guide 64, which is slidably fitted in a guide groove 66 (FIG. 15) provided at a portion of the casing 12 on the insertion side based on the pickup inserting hole 18. In the embodiment, the guide groove 66 is formed on an inner surface of the casing 12.

Figure 12:
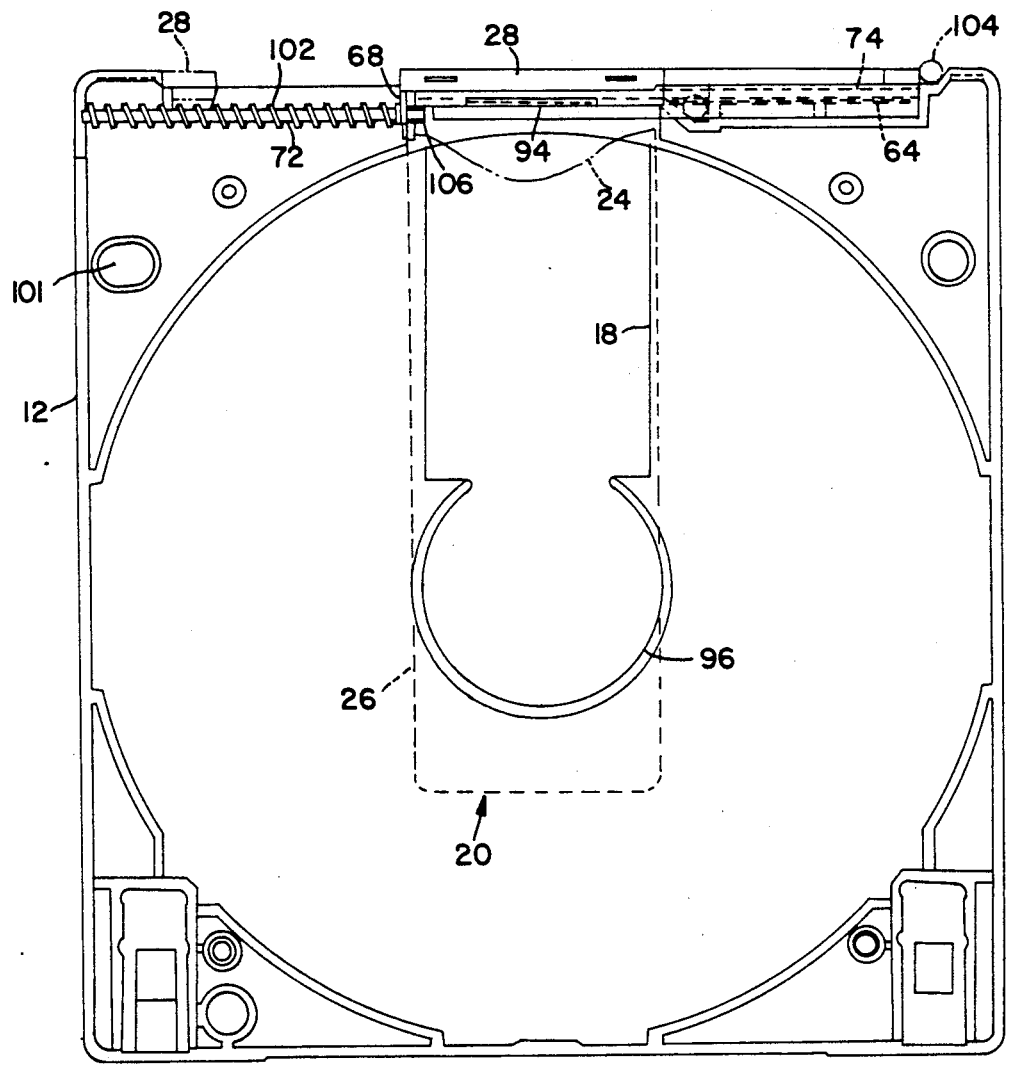
FIG. 12 is a plan view showing a lower casing member on which a shutter is fitted.
Figure 14:
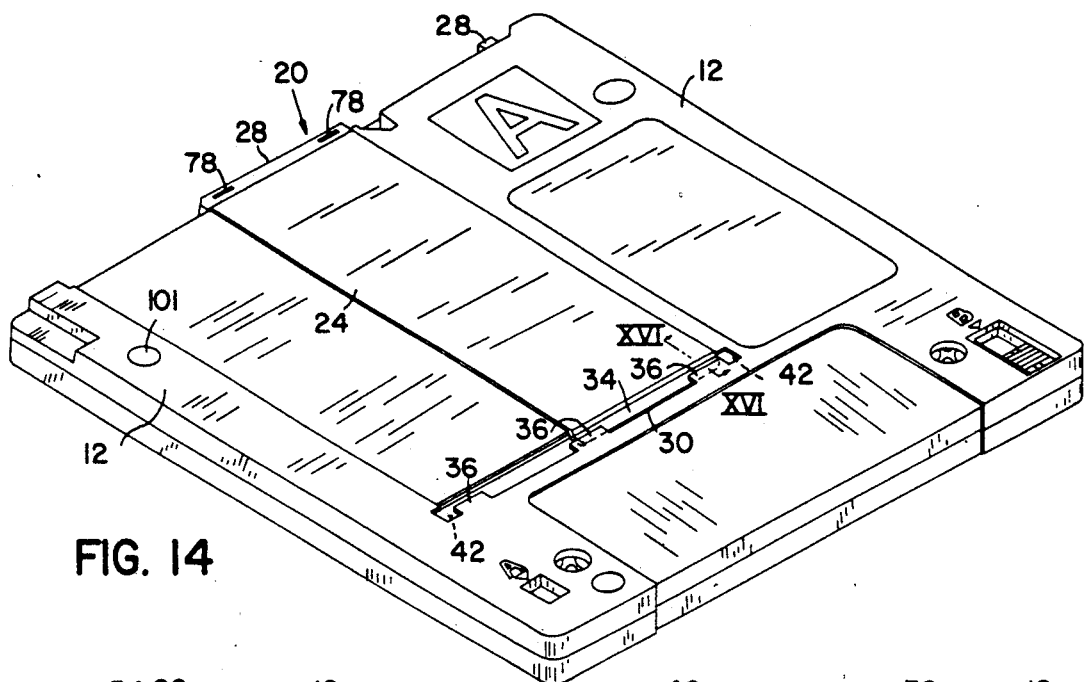
FIG. 14 is a perspective view of the disc cartridge shown in FIG. 4 wherein a shutter is moved to close a pickup inserting hole.
Figure 15:
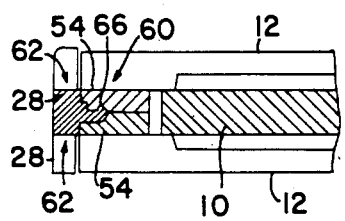
FIG. 15 is a fragmentary enlarged sectional view taken along line XV—XV of FIG. 13.

The shutter 20 also includes a side wall 68 arranged on a side thereof opposite to the second thin-walled section 58 and formed with a support hole 70, as shown in FIGS. 6 and 9, in which a shaft 72 (FIGS. 5 and 12) is fitted so that the slider 28 may be slidably guided on the shaft 72, as shown in FIG. 12. Also, the slider 28 is provided on the other side thereof opposite to the side wall 68 with a horizontally extending guide projection 74 through the riblike guide 64 of the slider 28, which is engagedly fitted in a guide section such as the guide groove 66 of the casing 12 or the like. The guide projection 74 is provided on the second thin-walled section 58.

The support hole 70 of the side wall 68 of the slider 28 is opened sideways. More specifically, in the illustrated embodiment, it takes the form of an elongated cutout of which a free end or rear end 76 is opened, so that the end 76 of the side wall 68 is bifurcated through the cutout 70. The guide projection 74 is positioned on a central axis of the support hole 70. Such arrangement of the projection 74 effectively prevents it from projecting to a position in proximity to an upper or lower surface of the slider 28.

Figure 10:
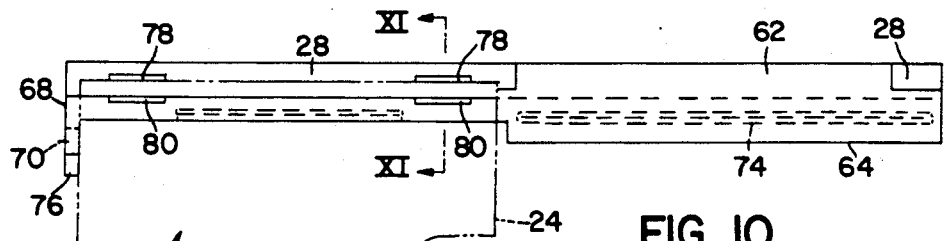
FIG. 10 is a plan view showing a slider of a shutter.
Figure 11:
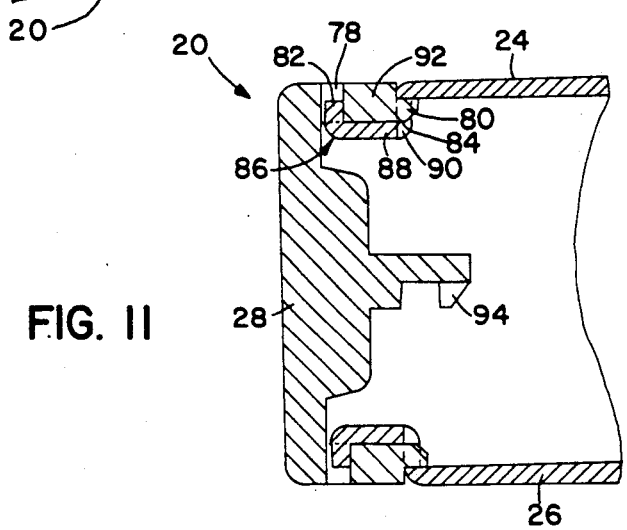
FIG. 11 is a fragmentary enlarged sectional view taken along line XI—XI of FIG. 10.

As shown in FIGS. 9 to 11, the slider 28 is provided on each of upper and lower sides of a portion thereof covered with the shutter plates 24 and 26 with each pair of holes 78 and projections 80 for engagement and correspondingly each of the upper and lower shutter plates 24 and 26 is provided with each pair of projections 82 and holes 84, which are respectively engaged with the holes 78 and projections 80, resulting in the shutter plates 24 and 26 being connected to the slider 20. The projections 82 and holes 84 of each shutter plate are arranged at a stepped connection section 86 of each shutter plate which is connected to the slider 28 and formed into a substantially L-shape.

More particularly, as shown in FIG. 11, the projections 82 are upwardly arranged at a distal end of a horizontal portion 88 of the stepped connection section 86 and the holes 84 are arranged at a vertical portion 90 of the stepped connection section 86. The holes 78 and projections 80 are arranged at each of connection sections 92 of the slider 28 which ar arranged in a manner to horizontally inwardly project from both upper and lower ends of the slider 28 in the same direction and connected to the upper and lower shutter plates 24 and 26. More particularly, the holes 78 each are provided at a horizontal portion of the connection section 92 in proximity to the slider 28 and the projections 80 each are provided at an end surface of the connection section 92. The connection between the slider 28 and each of the shutter plates 24 and 26, as shown in FIG. 11, is carried out by fitting the projections 80 of the slider 28 in the holes 84 of the shutter plate and fitting the projections 82 of the shutter plate in the holes 78 of the slider 28 while abutting an inner surface of the horizontal portion of the connection section 92 of the slider 28 against the horizontal section 88 of the stepped connection section 86 of the shutter plate and abutting the end surface of the connection section 92 against the vertical portion 90 of the stepped connection section 86.

Figure 5:
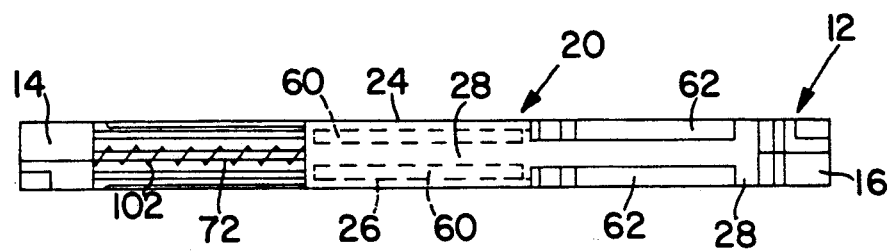
FIG. 5 is a front elevation view of the disc cartridge shown in FIG. 4.

The slider 28 may be provided with a projection 94 (FIG. 11) which is slidably fitted in the guide groove 66 of the casing 12, to thereby cause the slider 28 to be slidably moved with respect to the casing 12. Also, the casing 12 is formed at a central portion thereof with circular openings 96, in which hubs 98 of the disc 10 are received. Further, the casing 12 is formed with recesses 100 for slidably receiving the shutter 20 therein in addition to the pickup inserting holes 18 described above and a pin inserting hole 101. The shutter 20 is constantly urged in a direction of closing the pickup inserting holes 18 by a return spring 102 wound on the shaft 72 as shown in FIGS. 5 and 12. Thus, the pickup inserting holes 18 are kept covered with the shutter 20 in nonuse of the disc cartridge; whereas when the disc cartridge is loaded in a cartridge operating unit, the shutter 20 is slid on the shaft 48 through engagement between a shutter operating pin 104 (FIG. 12) of the unit and the slider 28 in a direction of opening the holes 18 against the return spring 102, resulting in the holes 18 being opened. When the cartridge is drawn out from the unit, the return spring 102 moves the shutter to the original position to close the holes 18.

Reference numeral 106 (FIG. 12) designates a shaft holding groove provided on the inner surface of the casing 12.

As described above, the disc cartridge of the present invention is so constructed that at least one of the shutter plates is formed at its distal end with the depression which is slidably interposed between the recess of the casing and the holding plate received in the recess and the holding element is provided at the casing so as to positively and stably hold the holding plate in the recess. Such construction permits the holding plate to be readily arranged in the casing by merely fitting it in the recess. Thus, assembling of the disc cartridge is readily accomplished without using any adhering means and operation. Also, the present invention causes the holding plate to be small-sized to ensure smooth operation of the shutter with high reliability and accuracy, as well as facilitates mounting of the shutter on the casing without adversely affecting the disc and negatively affecting the aesthetic characteristics of the cartridge.

It will thus be been that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A disc cartridge comprising:
    a casing having a space defined therein and formed with at least one pickup inserting hole;
    a disc insertable into said space in said casing;
    a shutter formed into a substantially U-shape and including an upper shutter plate and a lower shutter plate, said shutter being slidably fitted on said casing for covering and uncovering said pickup inserting hole;
    at least one of said shutter plates being inwardly bent at a distal end thereof;
    said casing being formed with a recess for receiving said bent end of said shutter plate;
    a holding plate received in said recess of said casing;
    said bent end of said shutter plate being slidably interposed between a bottom surface of said recess and said holding plate; and
    holding means provided at said casing and arranged above said holding plate for holding said holding plate in said recess;
    wherein said holding means comprises at least one holding element formed at said casing in a manner to overhand said recess.

2. A disc cartridge as defined in claim 1, wherein said holding element is in the form of a projection.

3. A disc cartridge as defined in claim 1, wherein said holding element is formed so that its outer surface is flush with an outer surface of said casing.

4. A disc cartridge as defined in claim 3, wherein said holding element is formed integral with said casing.

5. A disc cartridge as defined in claim 1, wherein said holding means comprises a plurality of holding elements formed at said casing in a manner to overhang said recess and be spaced from each other at predetermined intervals in a direction of movement of said shutter.

6. A disc cartridge as defined in claim 5, wherein each of said holding elements is formed so that its outer surface is flush with an outer surface of said casing.

7. A disc cartridge as defined in claim 1, wherein said bent end of said at least one of said shutter plates is formed through a stepped portion.

8. A disc cartridge as defined in claim 1, wherein said holding plate has a length substantially equal to a stroke width of said shutter.

9. A disc cartridge as defined in claim 8, wherein said holding plate is made of a metal strip.

10. A disc cartridge as defined in claim 8, wherein said recess of said casing is provided on a portion of its bottom surface inside each of said holding grooves with a position regulating rib of a thickness equal to or more than a thickness of said shutter plate.

11. A disc cartridge as defined in claim 1, wherein both ends of said holding plate are perpendicularly bent in the same direction and said casing is formed with holding grooves for holding said bent ends of said holding plate therein.

12. A disc cartridge as defined in claim 11, wherein said holding grooves are formed at said recess of said casing.

13. A disc cartridge as defined in claim 1, wherein said holding plate is made of a metal strip; and
    said recess of said casing is formed with holding grooves in which both ends of said holding plate are held due to elasticity of said holding plate.

14. A disc cartridge comprising:
    a casing comprising an upper casing member and a lower casing member joined together to define a space therein, said casing being formed with at least one pickup inserting hole;
    a disc insertable into said space in said casing;
    a shutter formed into a substantially U-shape and including an upper shutter plate and a lower shutter plate, said shutter being slidably fitted on said casing for covering and uncovering said pickup inserting hole;
    said shutter plates each being inwardly bent at a distal end thereof;
    said upper and lower casing members of said casing each being formed with a recess for receiving said bent end of each of said shutter plates;
    a holding plate received in said recess of each of said upper and lower casing members;
    said bent end of each of said shutter plates being slidably interposed between a bottom surface of said recess and said holding plate; and
    a plurality of holding elements provided at each of said upper and lower casing members and positioned above said holding plate for holding said holding plate in said recess;
    said holding elements being arranged at each of said upper and lower casing members in a manner to overhand said recess and be spaced from each other at predetermined intervals in a direction of movement of said shutter.

* * * * *